Patented Apr. 8, 1924.

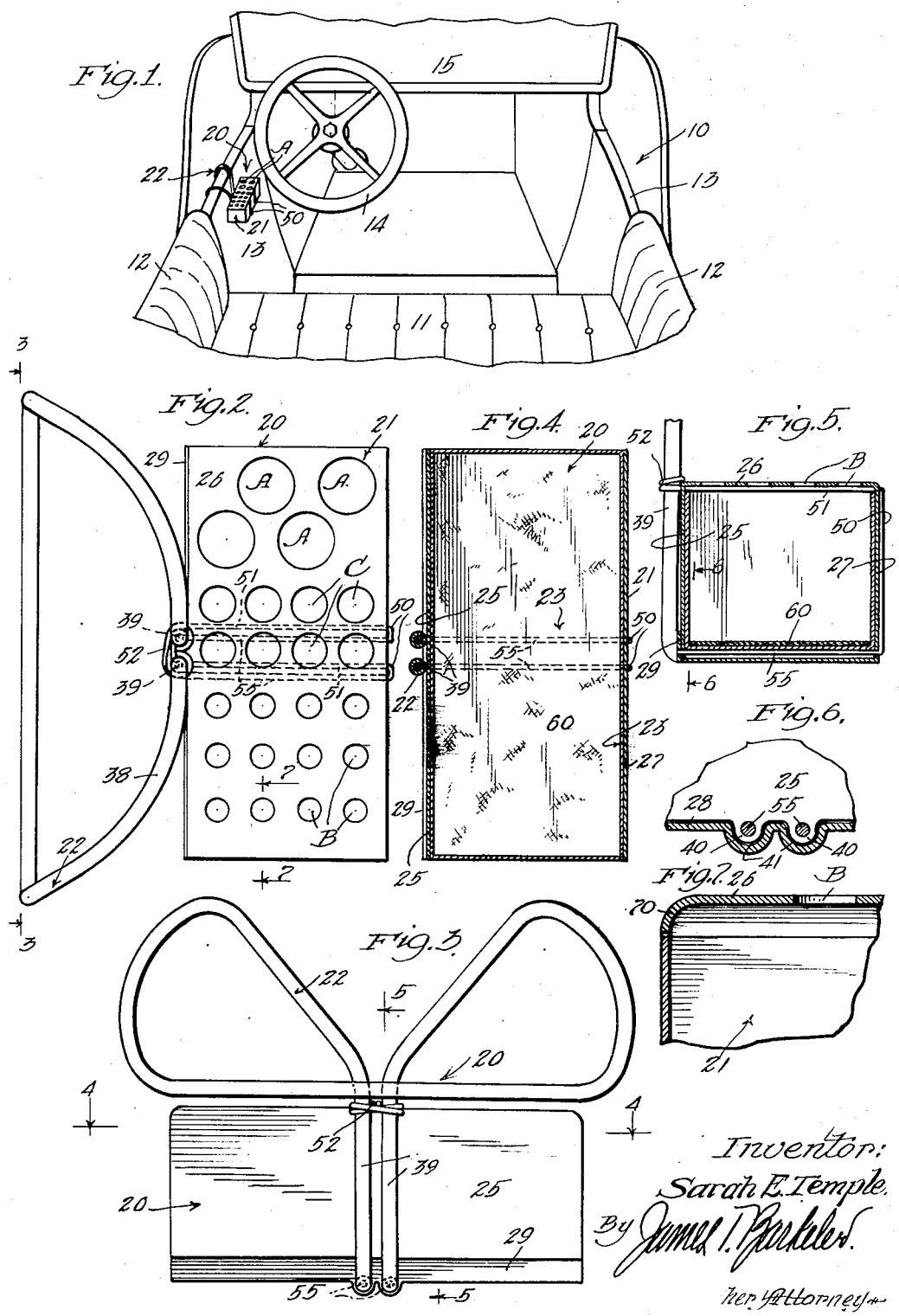

1,489,617

UNITED STATES PATENT OFFICE.

SARAH E. TEMPLE, OF UPLANDS, CALIFORNIA.

RECEPTACLE FOR STUBS OF MATCHES, CIGARS, CIGARETTES, ETC.

Application filed June 27, 1921. Serial No. 480,685.

*To all whom it may concern:*

Be it known that I, SARAH E. TEMPLE, a citizen of the United States, residing in Uplands, county of San Bernardino, State of California, have invented new and useful Improvements in Receptacles for Stubs of Matches, Cigars, Cigarettes, Etc., of which the following is a specification.

This invention has to do with a receptacle for match, cigar and cigarette stubs, etc., and it is an object of the invention to provide a simple, effective, convenient device of this character adapted to be used in connection with a motor car or the like.

In wooded and grain countries it frequently occurs that very destructive fires are unintentionally started by motorists throwing lighted match, cigar, cigarette stubs, etc., from their motor cars. Burning objects thrown from motor cars generally smoulder some little time before they light other objects and thus allow the motorists to get far from the scene of the fire without knowledge of it.

It is a primary object of this invention to provide a device which can be attached to a motor car so that the occupants thereof can conveniently place match, cigar, and cigarette stubs, etc., in it and thus obviate the danger of starting forest and grain fires.

Another object of the invention is to provide a device which can be attached to a motor car without damaging or marring it in any way and which is capable of being attached to motor vehicles of all makes and types.

The various objects, features and advantages of the present invention will be best and more fully understood from the following detailed description of a typical preferred embodiment of the invention throughout which reference is had to the accompanying drawings in which—

Fig. 1 is a perspective view of a portion of a typical motor car showing the device of the present invention attached to it; Fig. 2 is an enlarged plan view of the device; Fig. 3 is an enlarged rear view of the device, being a view taken as indicated by line 3—3 on Fig. 2; Fig. 4 is a detailed sectional view taken as indicated by line 4—4 on Fig. 3; Fig. 5 is a transverse detailed sectional view taken as indicated by line 5—5 on Fig. 3; Fig. 6 is an enlarged detail sectional view taken as indicated by line 6—6 on Fig. 5; and Fig. 7 is an enlarged detail sectional view taken as indicated by line 7—7 on Fig. 2.

Throughout the drawings numeral 10 designates a typical motor car embodying a seat 11, side walls 12, doors 13 in the side walls 12, a steering wheel 14, a windshield 15 arranged forward of the seat 11 and steering wheel 14, etc. The device of the present invention is capable of being attached to a motor car of practically any design and construction and therefore it is to be understood that its application is not limited in any way to a motor car of the specific type, construction or arrangement set forth in Fig. 1 of the drawings. In Fig. 1 of the drawings I have shown a construction and arrangement commonly found in motor vehicles merely for the purpose of facilitating a clear, accurate understanding of the manner in which the device of the present invention may be applied to a motor vehicle.

The device 20 provided by the present invention comprises, generally, a body or casing 21, a hook like bracket 22, by which the casing may be attached to a suitable part of a motor car, and a box 23 carried in the casing 21. The casing 21 is preferably formed of a single piece of material, preferably metal, shaped to have a vertical part 25, hereinafter termed the rear wall, a horizontally disposed part 26 extending outwardly from the upper end of the rear wall 25 and hereinafter termed the top, a vertically disposed part 27 extending downwardly from the outer edge of the top 26, and hereinafter termed the outer wall, a horizontally disposed part 28 extending inwardly from the lower edge of the outer wall 27 and hereinafter termed the bottom, and a vertically disposed flange 29 extending upwardly from the inner edge of the bottom 28 immediately outside of the inner wall 25. The body 21 is preferably somewhat longer than it is wide or deep and is preferably open at both ends.

In accordance with the present invention there is a plurality of openings provided in the top 26. The openings are preferably round and are preferably of various sizes. For instance, there is a plurality of comparatively large openings A, at one end of the body, a plurality of comparatively small openings B at the other end of the body and a plurality of medium sized openings C at the center portion of the body between the openings A and the openings B.

The bracket 22 is formed of a piece of wire, or the like, bent or shaped to form a broad hook and to attach to the casing 21 by extending around it. The wire is doubled or looped so that the hook part 38 is formed by the outer part of the loop and is comparatively broad and large. The two side parts of the wire formed by looping it extend from the outer part which forms the hook 38 having inner parts 39 extending downwardly outside of the rear walls 25, bottom parts 55 extending outwardly through tabs 40 formed at the lower edge of the rear wall 25 and through depressions 41 formed in the bottom 28, outer parts 50 which extend upwardly outside of the outer wall 27, top parts 51 which extend inwardly through perforations in the front and rear walls and immediately under the top 26, and have their extreme end portions 52 wrapped around the portions 39 where they join the looped portion. With this arrangement a very effective mounting bracket is provided for the casing 21 and the casing 21 is effectively bound or held in proper shape. In accordance with the present invention the looped portion of the wire and also the rear portions 39 are covered, say for instance with the fabric or rubber, so that they will not mar or scratch those parts of the motor car which they engage. It will be particularly noted that the rear parts 39 are outside of the rear wall 25 and thus form spacing members which hold the body 21 away from the motor car. The bottom parts 55 in extending through the tabs 40 hold the rear wall 25 in the proper relation to the bottom 28, and in extending through the depressions 41 do not interfere with the box 23, hereinafter described.

The box 23 is an open topped rectangular structure which slidably fits in the casing 21. The box 23 is preferably, although not necessarily, formed of metal or the like and is provided with an inner bottom 60 of asbestos or the like. The box 23 preferably fits snugly in the casing 21 so that it will not be displaced therefrom by vibration and jarring of the motor car but still can be removed from or placed into the casing by hand. In view of the fact that the portions 51 of the wire extend under the top 26 the box cannot be made sufficiently large to fit closely up against the bottom 26. In accordance with the invention the ends of the top 26 are turned down at 70 to meet the top of the box 23 and thus compensate for the difference in depth between the casing and the box.

In operation it is preferred that the device be mounted by placing the bracket 22 over the door 13 of the vehicle in a manner such as is shown in Fig. 1 of the drawings. However, if it is desired to attach the device to some other part of the vehicle and it is found that the bracket is not the proper shape it is possible to bend or manipulate the wire sufficiently to make the bracket attachable to such part. When the device is suitably mounted on the vehicle the motorist can conveniently place match, cigarette and cigar stubs, etc., in it through the openings provided in the top 26. The various openings A, B and C in the top 26 are to accommodate various sized objects, for instance, the large holes A may be used for cigar stubs, the small holes B may be conveniently used for match stubs, and the medium sized holes C may be conveniently used for cigarette stubs. Burning stubs placed in the device through the openings in the top 26 will rest upon the asbestos bottom 60 in the box 23 which is effective in insulating the burning objects from the other parts of the device and in preventing any parts of the device being ignited by the objects. The rear portions 39 of the wire, in separating the casing 21 and therefore the box 23 from the part of the motor car to which the device is attached, prevent the motor car from being scorched by the heat of the objects in the box should they ignite. The device can be readily detached from the motor car and used while camping or in various other situations.

Having described only a preferred form of my invention, I do not wish to limit myself to the particular details hereinabove set forth but wish to reserve to myself any changes or variations that may appear to those skilled in the art or that may fall within the scope of the following claims.

Having described a preferred from of my invention, I claim:

1. In a device of the character described an open ended casing having an opening in its top, an open topped box removably carried in the casing, and a mounting and carrying bracket in connection with the casing and comprising a hook shaped part formed of a wire loop, the two ends of the wire extending down along one side of the casing and then across its bottom and up its opposite side and across its top and there secured to the portions of the wires that extend down the first mentioned side.

2. In a device of the character described an open ended casing having an opening in its top, an open topped box removably carried in the casing, and a mounting and carrying bracket in connection with the casing and comprising a hook shaped part formed of a wire loop, the two ends of the wire extending down along one side of the casing and then through the bottom part of the casing to the opposite side and then up the opposite side and then through the top part of the casing to the first mentioned side where the wire ends are secured to the wire portions at that first mentioned side.

In witness that I claim the foregoing I have hereunto subscribed my name this 16th day of June, 1921.

SARAH E. TEMPLE.

Witnesses:
 FRANK K. NICHOLS,
 A. F. LEMON.